(12) United States Patent  
Maples et al.

(10) Patent No.: US 6,262,945 B1  
(45) Date of Patent: Jul. 17, 2001

(54) SEISMIC SIGNAL COUPLING DEVICE AND METHOD

(75) Inventors: Michael Maples; Alan Sprain, both of Houston, TX (US); Yves Delassis, Bievres; Julien Meunier, Paris, both of (FR)

(73) Assignee: Syntron, Inc., Houston, TX (US)

( * ) Notice: Subject to any disclaimer, the term of this patent is extended or adjusted under 35 U.S.C. 154(b) by 0 days.

(21) Appl. No.: 09/289,503

(22) Filed: Apr. 9, 1999

(51) Int. Cl.[7] ....................................................... G01V 1/38
(52) U.S. Cl. ............................................. 367/154; 367/20
(58) Field of Search ................................ 367/16, 17, 154, 367/13, 20, 157, 149, 106; 248/65; 174/101.5

(56) References Cited

U.S. PATENT DOCUMENTS 3,939,464 * 2/1976 Swenson ............................... 367/154
4,013,990 * 3/1977 Devine ................................. 367/106
5,883,857 * 3/1999 Pearce ................................... 367/20

* cited by examiner

Primary Examiner—Christine Oda
Assistant Examiner—Victor J. Taylor
(74) Attorney, Agent, or Firm—Bracewell & Patterson LLP

(57) ABSTRACT

A seismic coupling device for geophones firmly couples seismic sensors to the sea floor. The structure is open for the free flow of sea water and mud through the structure so that it moves freely through the sea water and solidly embeds itself in the ocean bottom. It is preferably made of a corrosion resistant metal, such as stainless steel, which also resists bending forces on the cable take-up reel, and provides further mechanical protection for sensor components enclosed within. A segmented ring at each end clamps around the protective enclosure which encloses the sensor package, and a further pair of segmented rings inside the ends clamps around the enclosure. A plurality of axially oriented longitudinal bars couple to the rings to form a squirrel cage around the enclosure.

13 Claims, 4 Drawing Sheets

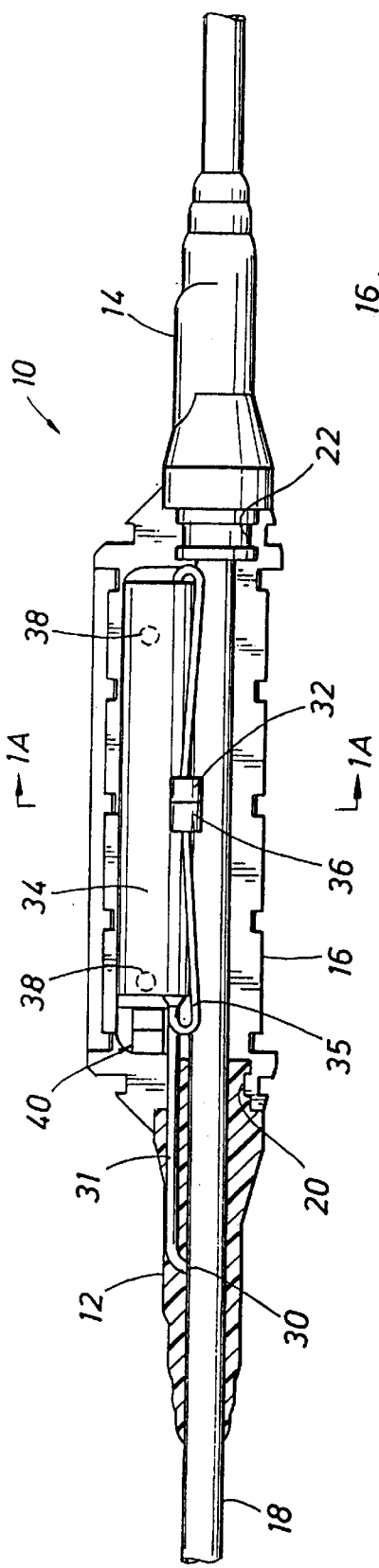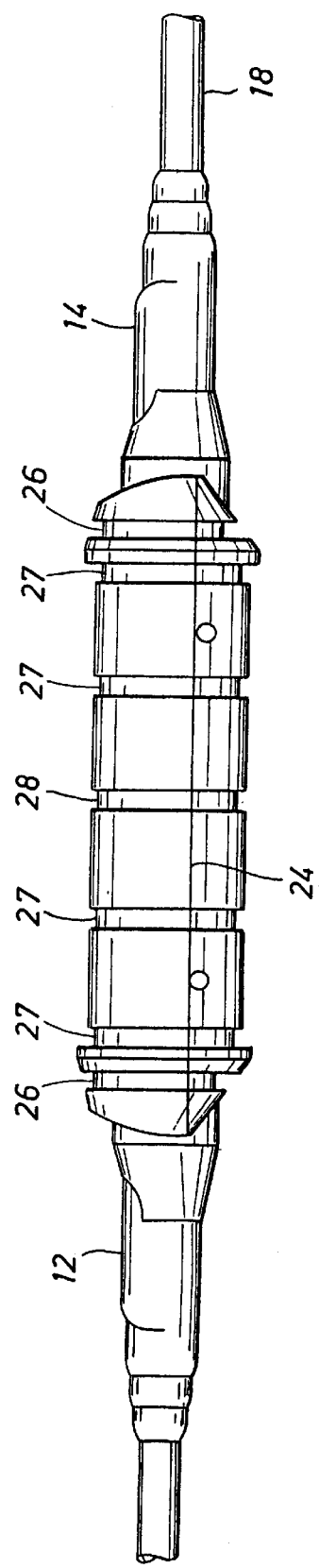

SEISMIC SIGNAL COUPLING DEVICE AND METHOD

FIELD OF THE INVENTION

The present invention relates generally to the field of takeout structures which connect a seismic sensor string to a cable, and particularly to a structure and a method for a coupling a seismic signal to a geophone in an ocean-bottom cable.

BACKGROUND OF THE INVENTION

To conduct an ocean bottom seismic survey, a cable having a plurality of pairs of electrical conductors is laid out along a survey line and connected at one end to a recording device. At spaced locations along the cable, a "takeout" is provided that enables the leader wire of a string of geophones to be electrically connected to one of the pairs of conductors inside the cable. Each pair of conductors and the phones connected to it form a data channel so that acoustic waves that are reflected upward from underground geologic structures are recorded on that channel.

Once a set of data has been captured and recorded along the survey line, the cable is commonly dragged to the next survey line in preparation for another set of data. The cable may also be retrieved and redeployed in a new location to acquire another set of data.

In dragging or redeploying the cable from one survey line to the next, the seismic sensor package is commonly subjected to a number of potentially damaging obstacles on the ocean floor. In the past, the sensor, takeout, and the region of the cable in close proximity to them have been wrapped in heavy tape, and sometimes enclosed in a shrink-wrap plastic to minimize this damage. Unfortunately, this wrapping has often proved less than satisfactory, resulting in damage to the cable, the sensor, and often leading to catastrophic sea water in-leakage at the cable penetrations.

Aside from sealing the takeout, the tape and wrap applied to the cable are intended to anchor the sensor package along with its connecting leader cable. As the wrapping is damaged, the sensor package with the connecting leader cable is allowed to move freely, causing a further mechanical damage to the sensors and connecting cable.

In U.S. patent application Ser. No. 09/255,452, filed Feb. 19, 1999 and assigned to the same assignee as the present application, a combination takeout anchor and protective cover is disclosed. This application is incorporated herein by reference. This structure fills this long-felt need of protecting the sensor components on an ocean-bottom seismic cable.

The structure disclosed in that application very satisfactorily fulfills its intended purpose. However, the overall performance of the entire seismic cable could be improved if the anchor and protective cover were to more effectively couple the sensor components to the ocean bottom. More effective coupling of the sensor and ocean bottom leads to improved imaging of the geologic structures which may bear the desired hydrocarbons which the seismic survey is intended to find.

Thus, there remains a need for a coupling structure to firmly embed the geophones of an ocean-bottom seismic cable to the sea floor. Such a structure should also resist the bending force on the sensor elements as the cable is reeled aboard a host vessel, and should also help to protect the sensor package as the cable is dragged along the ocean floor.

SUMMARY OF THE INVENTION

This invention solves these and other drawbacks of the prior art by providing an open-structure coupling device which is used in conjunction with or separate from the enclosure system of U.S. patent application Ser. No. 09/255,452 to firmly couple a seismic sensor package to the sea floor. The structure is open for the free flow of sea water and mud through the structure so that it moves freely through the sea water and solidly embeds itself in the ocean bottom. It is preferably made of a corrosion resistant metal, such as stainless steel, which also resists bending forces on the cable take-up reel, and provides further mechanical protection for sensor components enclosed within.

The preferred embodiment of the coupling device generally comprises a segmented ring at each end to clamp around the protective enclosure which encloses the sensor package, a further pair of segmented rings inside the ends and around the enclosure, and a plurality of axially oriented longitudinal bars coupled to the rings to form a squirrel cage around the enclosure. The bars may be inserted through holes in the rings, but the preferred rings are gear-like mounts with open lands to receive the bars. The bars are then welded or otherwise joined to the rings. The segments of the rings are also joined, preferably by bolts or screws so that the coupling device can be easily removed from the cable for easy access to the sensor package within for maintenance.

These and other features and advantages of this invention will become more apparent in connection with the following detailed description of a preferred embodiment, taken in conjunction with the appended drawings.

BRIEF DESCRIPTION OF THE DRAWINGS

FIG. 3 is a side sectional view of the enclosure system of U.S. patent application Ser. No. 09/255,452.

FIG. 3A is an end view of the one half of the enclosure taken along section A—A, depicting the locations of the three cavities within the enclosure body.

FIG. 4 is a top view of the enclosure, illustrating the mounting of the enclosure body to the opposing anchors.

DETAILED DESCRIPTION OF A PREFERRED EMBODIMENT

Figure 1:
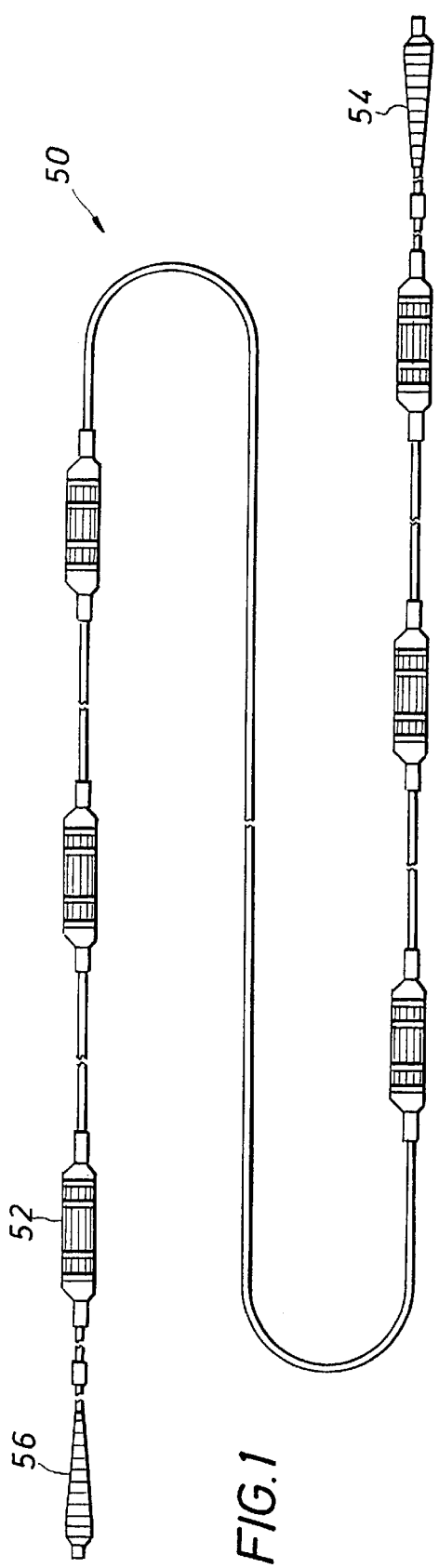
FIG. 1 is a schematic view of an ocean-bottom seismic cable with a number of the coupling devices of this invention.

FIG. 1 depicts a section of an ocean-bottom cable 50 having a plurality of seismic sensor geophones and associated takeouts 52. Such a section of cable is typically about 150 meters long, and the sensors are typically spaced apart along the cable at 25 meter intervals. An A-end 54 connects to another section or to a terminus on the host vessel and a B-end 56 connects to another section or to a tail-end cover (not shown). Each takeout 52 includes a sensor package, a surrounding enclosure, and the coupling device of this invention.

So that the structure of the coupling device of this invention can be more clearly understood, the enclosure will now be described in detail.

Structure of the Enclosure

Referring to FIGS. 3 and 4, an enclosure system 10 includes a combination takeout and anchor 12, an opposing anchor 14, and a protective cover 16 between them, all mounted to a main cable 18. FIG. 3 depicts a takeout pigtail drop exit from the main cable at the combination takeout and anchor 12, but a dual drop may be used. The combination takeout and anchor 12 is molded directly to the main cable 18 after connection is made to the appropriate pair of conductors within the cable by making a slit in the jacket of the cable, removing the insulation from short sections of the selected pair of the conductors, and joining the sensor leads to the bared ends of the conductors. In this way, the opening for the takeout is sealed and anchored by the molded body 12.

The opposing anchor 14 is also molded to the cable 18, and is shaped like the body 12. The body 12 includes an annular groove 20 and the anchor 14 has a similar annular groove 22, both of which are configured to receive a mating interior flange of the cover 16. The cover 16 is preferably formed as a pair of mating halves separated at a seam 24, and shown in FIG. 4. The cover 16 is then held together and in place with a plurality of bands 26, such as cable clamps made of a corrosion-proof material, which are applied within a plurality of annuli 28 in the cover. Other annuli 27 provide locations for mounting the coupling device of this invention, described below.

Connection to a selected pair of conductors in the cable 18 is made through a penetration 30. This lead, shown in FIG. 3 as a takeout pigtail 31, terminates in a connector end 32, which is connected to a sensor package 34 through a sensor hydrophone connector pigtail 35 to a connector end 36. Thus, the interior of the protective cover 16 includes substantially cylindrical cavities for three items: the cable 18, the sensor package 34, and the connector comprising the ends 32 and 36. This connector combination may be referred to as a pigtail connection.

FIG. 3A shows an end view of the cover 16 to illustrate the placement of the cavities within the cover which receive the various components inside the cover. The three cavities include the locations for the cable 18, the sensor package 34, and the pigtail connector 32, 36. Note that the cover 16 is an elongated cylinder, but it is not coaxial with the main cable. Also, the cover 16 includes vent holes 38 to permit the inflow of water for the conduction of acoustic signals to a sensor hydrophone 40.

Having now described the structure of the enclosure in detail, the description of the coupling device of this invention will now be described.

Seismic Coupler

Figure 2:
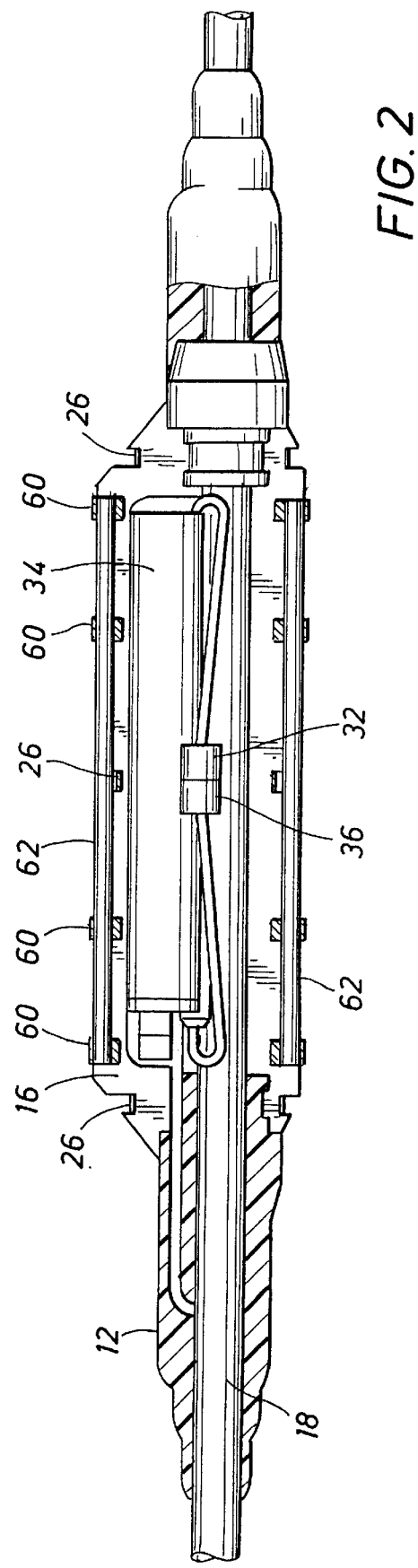
FIG. 2 is a side section view of one takeout of the ocean-bottom cable with an enclosure around the sensor package and the coupling device or this invention mounted thereon.

Referring now to FIG. 2, the cover 16 is mounted in two halves around the sensor package 34 and the pigtail connector 32, 36. The halves are held together with the cable clamps 26, but they are also held together by a plurality of rings 60. Coupled to the rings, as by welding, are a plurality of longitudinal bars 62. This open structure provides sea water access to the vent holes 38 for the inflow of sea water. The rings 60 and bars 62 are preferably made of stainless steel to provide adequate weight and to resist sea water corrosion. The rings and bars also provide stiffness to withstand bending forces as the cable is reeled onto a take-up reel on a vessel or bending due to passing over a sheave and through traction engines for storage on a vessel. Most importantly, the coupling device holds the cover with enclosed sensor package onto the ocean floor so that a seismic signal is most closely coupled to the sensor package within.

Figure 2A:
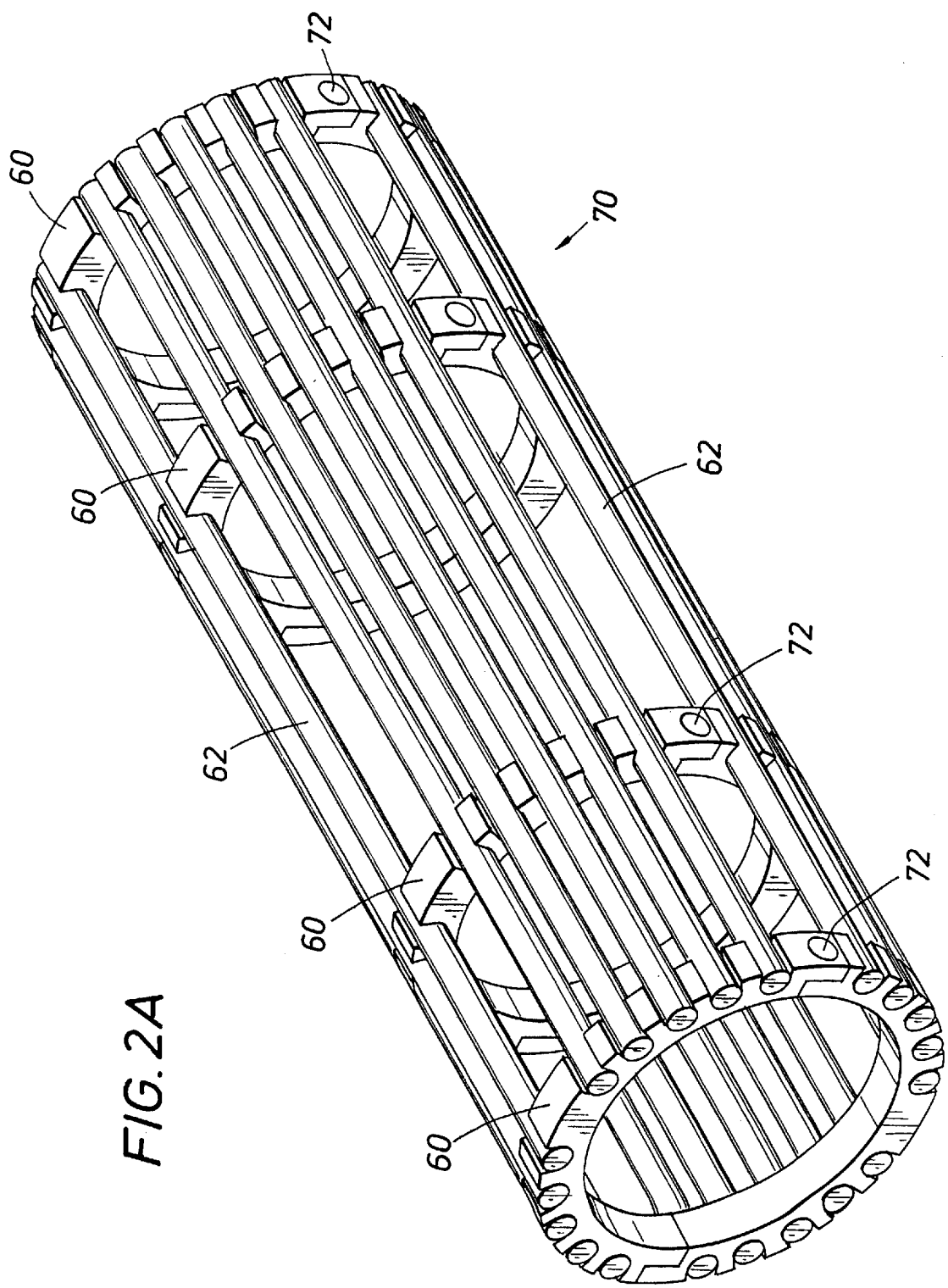
FIG. 2A is a perspective view of the coupling device alone without the cable or enclosure.

The structure of a coupling device 70 is shown more distinctly in FIG. 2A. The coupling device 70 comprises a plurality of rings 60, four of which are shown in FIG. 2A, while at least two are required. The rings 60 are joined by a plurality of longitudinal bars 62, running lengthwise parallel to the axis of the cable. The rings are preferably made in halves, joined by a set of pins 72, which are preferably threaded such as screws or bolts as desired. This way, the ring halves can be separated and the coupling device 70 removed from the cable for ease of access to the sensor package for maintenance.

Figure 5A:
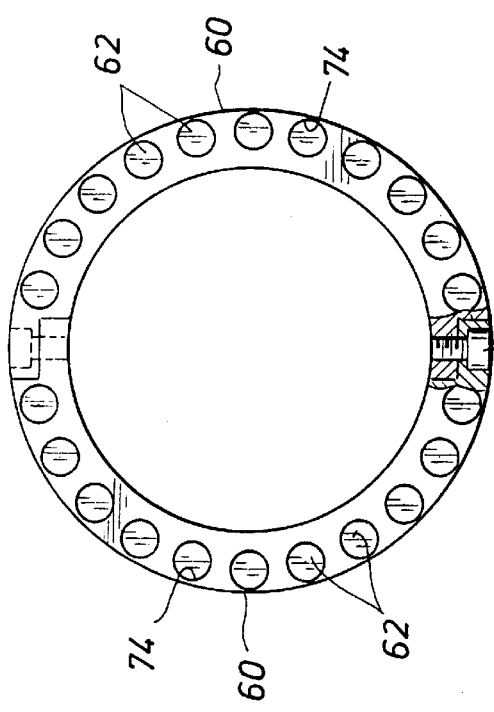
FIG. 5A is an end view of an embodiment of the coupling device.
Figure 5B:
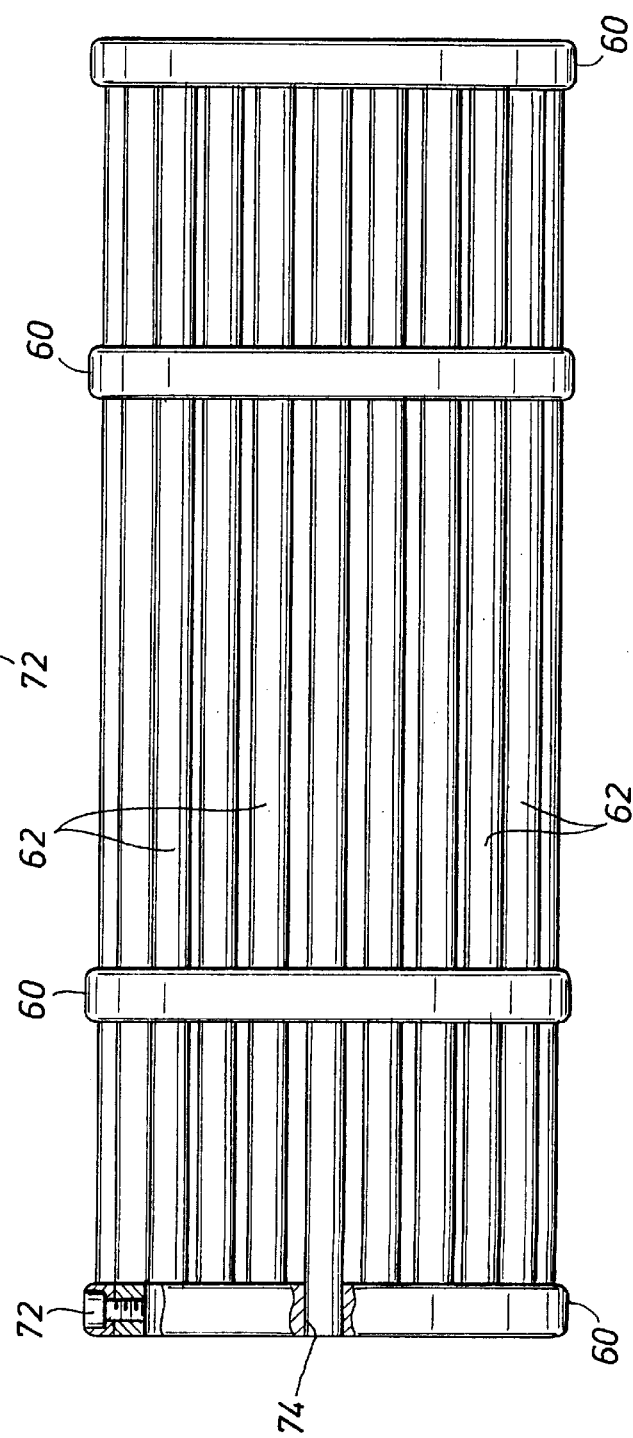
FIG. 5B is a side elevation view of this embodiment.

The ring halves when joined together preferably comprise gear-like elements, so that the bars can be inserted into the lands of the gear during assembly. An alternative arrangement is shown in FIGS. 5A and 5B. In this arrangement, each ring 60 includes a plurality of holes 74, each of which receives a bar 62. This structure offers a bit more mechanical rigidity than the gear arrangement of FIG. 2A but it is marginally more difficult and time consuming to assemble since the bars must be threaded through the holes. Just as with the arrangement of FIG. 2A, the ring halves are joined by pins 72.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A structure to couple a seismic signal to a geophone in a cable adapted to lie stationary on the ocean floor, the structure comprising:

a. an enclosure around the sensor, b. a pair of rings around the enclosure; and c. a plurality of longitudinal bars joining the rings, the longitudinal bars forming an open structure for the passage of water therethrough to conduct a seismic signal from the ocean floor to the sensor.

2. The structure of claim 1 wherein each of the rings includes gear teeth to receive the bars.

3. The structure of claim 1, wherein each of the rings comprises a pair of complementary ring-halves, and the ring-halves are pinned together with pins.

4. The structure of claim 3, wherein the pins comprise bolts.

5. The structure of claim 1 wherein each of the rings includes a plurality of holes therethrough to receive the bars.

6. A method of coupling a seismic signal to a sensor package on an ocean-bottom cable, comprising the steps of:

a. enclosing the sensor package in an enclosure;

b. mounting an open structure squirrel cage around the enclosure to permit the passage of water through the squirrel cage to contact the enclosure; and c. placing the squirrel cage on the ocean floor to receive the seismic signal from the ocean floor.

7. The method of claim 6, wherein the squirrel cage comprises:

a. a pair of rings around the enclosure; and b. a plurality of longitudinal bars joining the rings.

8. The method of claim 6, wherein the enclosure comprises:

a. a first anchor molded over a takeout on the cable and molded to the cable;
b. an opposing anchor molded to the cable and spaced apart from the first anchor; and
c. a protective cover between the first anchor and the opposing anchor and enclosing the sensor package.

9. A seismic signal coupler for coupling a seismic signal to a geophone in an ocean-bottom cable adapted to lie stationary on the ocean floor, the structure comprising:
 a. a protective cover around the sensor, the sensor electrically connected to the cable at a takeout, the protective cover comprising
  i. a first anchor molded over the takeout and molded to the ocean-bottom cable;
  ii an opposing anchor molded to the cable and spaced apart from the first anchor; and
  ii a hollow, substantially cylindrical covering between the first anchor and the opposing anchor and enclosing the sensor package;
 b. a pair of rings around the protective cover; and
 c. a plurality of longitudinal bars joining the rings, the longitudinal bars forming an open structure for the passage of water therethrough to conduct a seismic signal from the ocean floor to the sensor.

10. The coupler of claim 9 wherein each of the rings includes gear teeth to receive the bars.

11. The coupler of claim 9, wherein each of the rings comprises a pair of complementary ring-halves, and the ring-halves are pinned together with pins.

12. The coupler of claim 11, wherein the pins comprise bolts.

13. The coupler of claim 9 wherein each of the rings includes a plurality of holes therethrough to receive the bars.

* * * * *